(12) United States Patent
Roberge (10) Patent No.: US 10,724,543 B2
(45) Date of Patent: Jul. 28, 2020

(54) BRIDGE BRACKET FOR VARIABLE-PITCH VANE SYSTEM

(71) Applicant: United Technologies Corporation, Farmington, CT (US)

(72) Inventor: Gary D. Roberge, Tolland, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 56 days.

(21) Appl. No.: 15/674,646

(22) Filed: Aug. 11, 2017

(65) Prior Publication Data
US 2019/0048892 A1 Feb. 14, 2019

(51) Int. Cl.
| F04D 29/56 | (2006.01) |
| F04D 29/52 | (2006.01) |
| F04D 29/54 | (2006.01) |
| F02C 3/04 | (2006.01) |
| F01D 17/16 | (2006.01) |

(52) U.S. Cl.
CPC ......... *F04D 29/563* (2013.01); *F01D 17/162* (2013.01); *F02C 3/04* (2013.01); *F04D 29/522* (2013.01); *F04D 29/542* (2013.01); *F05D 2220/32* (2013.01); *F05D 2230/233* (2013.01); *F05D 2250/283* (2013.01); *F05D 2300/10* (2013.01); *F05D 2300/522* (2013.01)

(58) Field of Classification Search
CPC ........ F01D 17/162; F02C 3/04; F04D 29/522; F04D 29/542; F04D 29/563; F05D 2220/32; F05D 2230/233; F05D 2250/283; F05D 2300/10; F05D 2300/522
See application file for complete search history.

(56) References Cited

U.S. PATENT DOCUMENTS

| 3,685,920 A | 8/1972 | Burge |
| 9,353,644 B2 | 5/2016 | Leblanc et al. |
| 2008/0001039 A1* | 1/2008 | Winter ................. F01D 17/141 244/53 R |

FOREIGN PATENT DOCUMENTS

| EP | 1469166 A1 | 10/2004 |
| EP | 1672223 A2 | 6/2006 |
| EP | 2107217 A1 | 10/2009 |
| WO | 2014070630 A1 | 5/2014 |

OTHER PUBLICATIONS

European Search Report Issued in EP Application No. 18177099.1, dated Jan. 29, 2019, 6 Pages.

* cited by examiner

*Primary Examiner* — Lindsay M Low
*Assistant Examiner* — Ruben Picon-Feliciano
(74) *Attorney, Agent, or Firm* — Cantor Colburn LLP (57) ABSTRACT

A variable-pitch vane system for a gas turbine engine includes a plurality of vanes and a synchronization ring assembly operably connected to the plurality of vanes. The synchronization ring assembly includes a first synchronization ring, a second synchronization ring and a bridge bracket connecting the first synchronization ring to the second synchronization ring. The bridge bracket includes a first face sheet, a second face sheet, a honeycomb core located between the first face sheet and the second face sheet, a first attachment feature located at a first end of the bridge bracket at which the first synchronization ring is secured, and a second attachment feature located at a second end of the bridge bracket at which the second synchronization ring is secured.

18 Claims, 7 Drawing Sheets

BRIDGE BRACKET FOR VARIABLE-PITCH VANE SYSTEM

STATEMENT OF FEDERAL SUPPORT

This invention was made with Government support under contract FA8626-16-C-2139 awarded by the Air Force. The Government has certain rights in the invention.

BACKGROUND

Exemplary embodiments pertain to the art of gas turbine engines, and more particularly to variable-pitch vane systems for gas turbine engines.

Some portions of a gas turbine engine, including fan, low pressure compressor, high pressure compressor and turbine sections, may utilize stators or vanes with a variable pitch relative to the engine central axis. The variable pitch is often implemented using a sync ring, connected to each vane via a vane arm, and an actuator to drive rotation of the sync ring about the engine central axis. Rotation of the sync ring changes pitch of each of the vanes connected thereto via the vane arms.

Many gas turbine engines utilize split cases to enclose the rotating components, with such split cases having flanges at which a first case half is secured to a second case half. Use of such cases and the existence of the flanges requires the use of bridge brackets in the variable-pitch vane system to span the protruding flanges.

BRIEF DESCRIPTION

A bridge bracket for a variable-pitch vane system of a gas turbine engine includes a first face sheet, a second face sheet, a honeycomb core located between the first face sheet and the second face sheet, and one or more attachment features located at opposing ends of the bridge bracket, the one or more attachment features configured for securing the bridge bracket to a synchronization ring of the gas turbine engine.

Additionally or alternatively, in this or other embodiments the one or more attachment features includes one or more spools extending through the bridge bracket from first face sheet to the second face sheet.

Additionally or alternatively, in this or other embodiments the one or more spools are secured in the bridge bracket by one of orbital machining or electron beam welding.

Additionally or alternatively, in this or other embodiments one or more of the first face sheet, the second face sheet and the honeycomb core are formed from a metallic material.

Additionally or alternatively, in this or other embodiments a reinforcing edge portion is secured to the bridge bracket.

Additionally or alternatively, in this or other embodiments the reinforcing edge portion extends over the one or more attachment features.

Additionally or alternatively, in this or other embodiments the reinforcing edge portion is secured to the bridge bracket via welding or brazing.

In another embodiment, a variable-pitch vane system for a gas turbine engine includes a plurality of vanes and a synchronization ring assembly operably connected to the plurality of vanes. The synchronization ring assembly includes a first synchronization ring, a second synchronization ring and a bridge bracket connecting the first synchronization ring to the second synchronization ring. The bridge bracket includes a first face sheet, a second face sheet, a honeycomb core located between the first face sheet and the second face sheet, a first attachment feature located at a first end of the bridge bracket at which the first synchronization ring is secured, and a second attachment feature located at a second end of the bridge bracket at which the second synchronization ring is secured.

Additionally or alternatively, in this or other embodiments the first attachment feature and the second attachment feature each include a spool extending through the bridge bracket from first face sheet to the second face sheet.

Additionally or alternatively, in this or other embodiments the spool is secured in the bridge bracket by one of orbital machining or electron beam welding.

Additionally or alternatively, in this or other embodiments one or more of the first face sheet, the second face sheet and the honeycomb core are formed from a metallic material.

Additionally or alternatively, in this or other embodiments a reinforcing edge portion is secured to the bridge bracket.

Additionally or alternatively, in this or other embodiments the reinforcing edge portion extends over one or more of the first attachment feature and the second attachment feature.

Additionally or alternatively, in this or other embodiments the reinforcing edge portion is secured to the bridge bracket via welding or brazing.

In yet another embodiment, a compressor section of a gas turbine engine includes a compressor case including a first case portion, and a second case portion. The first case portion is secured to the second case portion at a protruding flange. A plurality of vanes are located in the compressor case. A synchronization ring assembly is located outside of the compressor case and is operably connected to the plurality of vanes. The synchronization ring assembly includes a first synchronization ring, a second synchronization ring, and a bridge bracket located at the protruding flange and connecting the first synchronization ring to the second synchronization ring. The bridge bracket includes a first face sheet, a second face sheet, a honeycomb core located between the first face sheet and the second face sheet, a first attachment feature located at a first end of the bridge bracket at which the first synchronization ring is secured, and a second attachment feature located at a second end of the bridge bracket at which the second synchronization ring is secured.

Additionally or alternatively, in this or other embodiments the first attachment feature and the second attachment feature each include a spool extending through the bridge bracket from first face sheet to the second face sheet.

Additionally or alternatively, in this or other embodiments the spool is secured in the bridge bracket by one of orbital machining or electron beam welding.

Additionally or alternatively, in this or other embodiments one or more of the first face sheet, the second face sheet and the honeycomb core are formed from a metallic material.

Additionally or alternatively, in this or other embodiments a reinforcing edge portion is secured to the bridge bracket.

Additionally or alternatively, in this or other embodiments the reinforcing edge portion extends over one or more of the first attachment feature and the second attachment feature.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
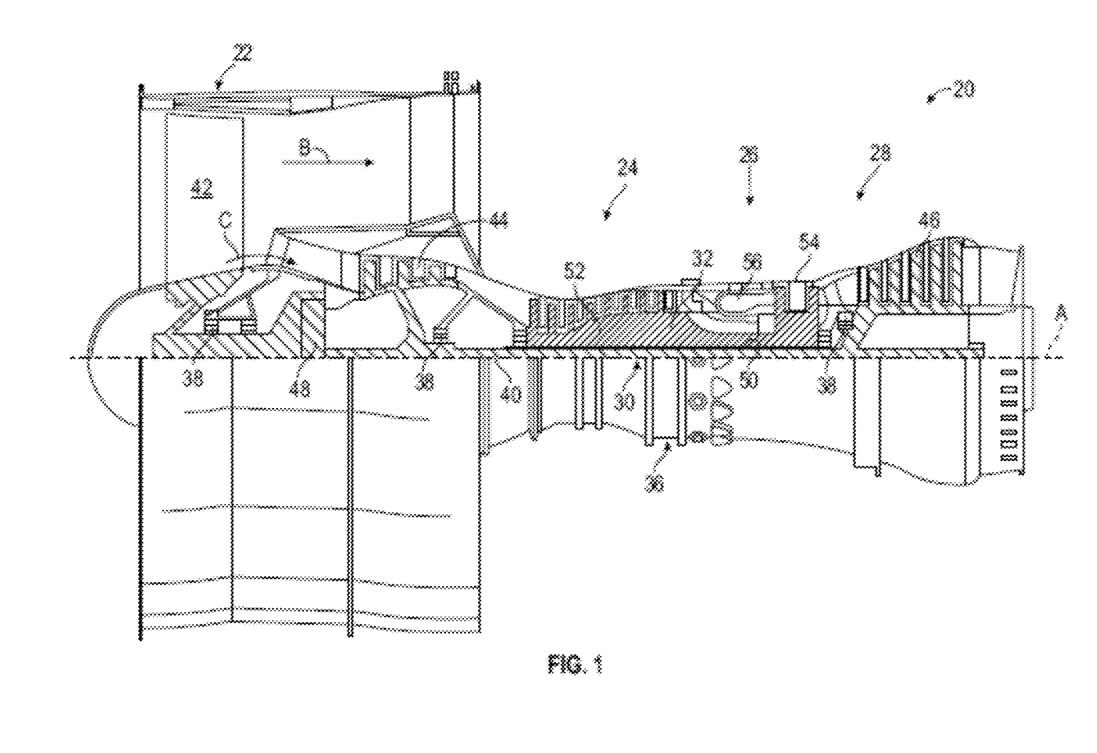
FIG. 1 is a cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

While described in the context of the configuration illustrated in FIG. 1, one skilled in the art will readily appreciate that the present disclosure may be readily applied to other configurations, such as those utilized for supersonic flight conditions, low-bypass turbofan configurations, and or those with variable inlet guide vanes and/or variable vanes in a multi-stage fan configuration.

Figure 2:
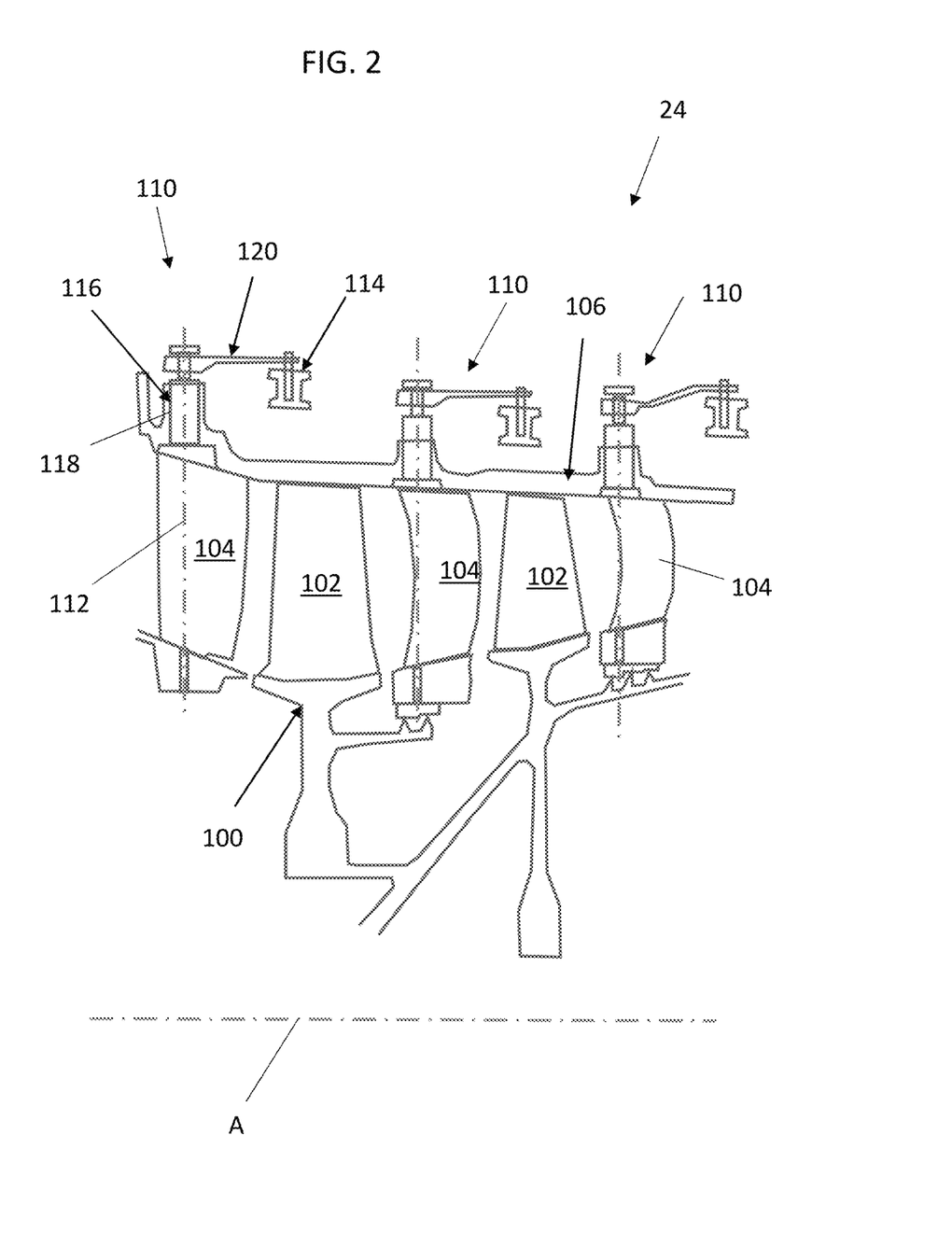
FIG. 2 is a cross-sectional view of an embodiment of a compressor of a gas turbine engine.

FIG. 2 illustrates a cross-sectional view of a portion of the compressor section 24, which may reside in the low pressure compressor 44 or the high pressure compressor 52. Further, while the embodiments disclosed herein are described in the context of the compressor section 24, the present disclosure may be applied to the turbine section 28. The compressor section 24 includes a compressor rotor 100 is rotatable about the engine central longitudinal axis A and includes one or more stages or circumferentially extending rows of compressor blades 102. The compressor section 24 further includes one or more vane stages 110 each including a circumferentially extending row of compressor vanes 104, in an axially alternating arrangement with the compressor blades 102. The compressor vanes 104 and compressor blades 102 are disposed inside a compressor case 106. One or more of the vane stages 110 are variable-pitch vane stages 110 such that each compressor vane 104 is rotatable about a vane axis 112. To accomplish the desired uniform rotation of the compressor vane 104 about the vane axis 112, the compressor vanes 104 are connected to a synchronization ring 114, such that circumferential movement of the synchronization ring 114 about the engine central longitudinal axis A urges movement of each of the compressor vanes 104 about their respective vane axes 112. In the embodiment of FIG. 2, each compressor vane 104 includes a vane stem 116 extending through a vane opening 118 in the compressor case 106. Outside of the compressor case 106, each vane stem 116 is connected to synchronization ring 114 via a vane arm 120.

Figure 3:
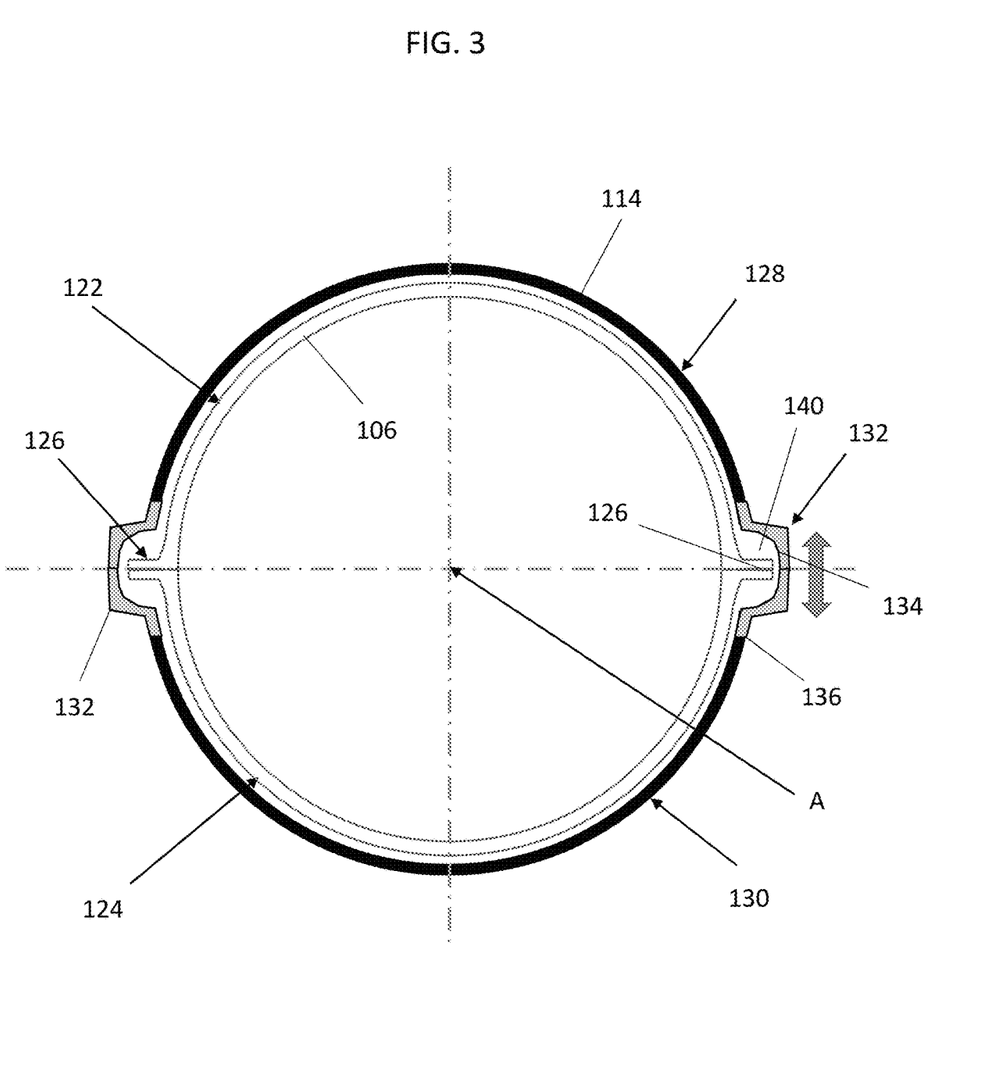
FIG. 3 is a cross-sectional view of an embodiment of a synchronization ring arrangement for a gas turbine engine.

Referring now to FIG. 3, in some embodiments the compressor case 106 includes a first case portion 122 (often an upper case portion) and a second case portion 124 (often a lower case portion), with the first case portion 122 connected to the second case portion 124 at a protruding case flange 126. In some embodiments, the first case portion 122 and the second case portion 124 each extend 180 circumferential degrees. Similarly, the synchronization ring 114 includes a first ring portion 128 (often an upper ring portion) and a second ring portion 130 (often a lower ring portion). The first ring portion 128 is connected to the second ring portion 130 at each end via a bridge bracket 132. The bridge bracket 132 spans the protruding case flange 126 such that circumferential motion of the first ring portion 128 is transmitted to the second ring portion 130 and vice versa, without causing the first ring portion 128 or the second ring portion 130 to collide with the protruding case flange 126.

Figure 4:
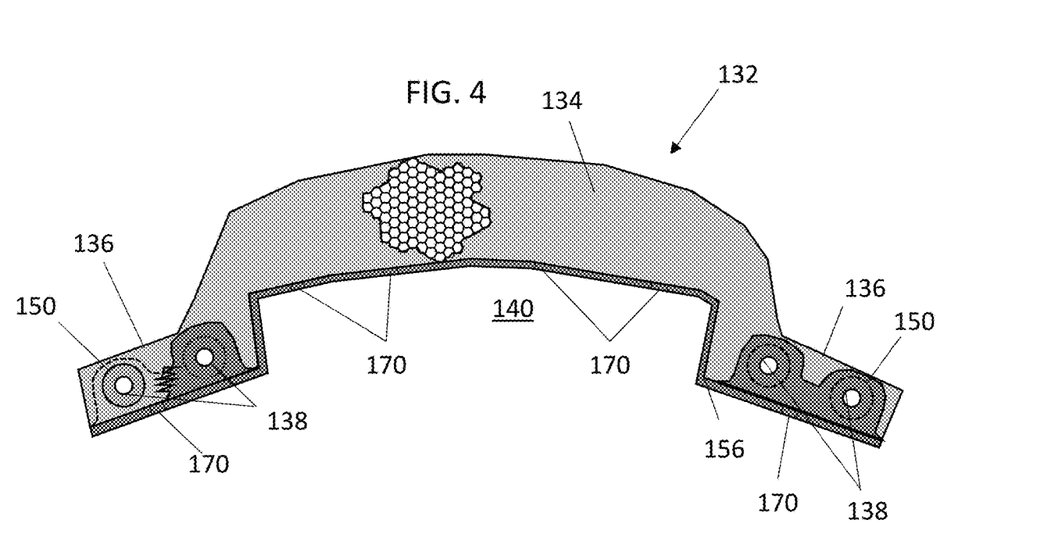
FIG. 4 is a schematic plan view of an embodiment of a bridge bracket.

Referring now to FIG. 4, a schematic plan view of an embodiment of a bridge bracket 132 is shown. The bridge bracket 132 includes a bracket body 134 and a bracket end portion 136 located at each opposing end of the bracket body 134. The bridge body 134 and the bracket end portions 136 define a bridge opening 140, which when installed to the compressor case 106, is positioned over the protruding case flange 126, as shown in FIG. 3. The bridge bracket 132 is formed from a honeycomb sheet structure material. In some embodiments, the bridge bracket 132 includes one or more vane attachment features 170 to provide kinematic input to the vanes 104 residing in the circumferential arc defined by the bridge bracket 132.

Figure 5:
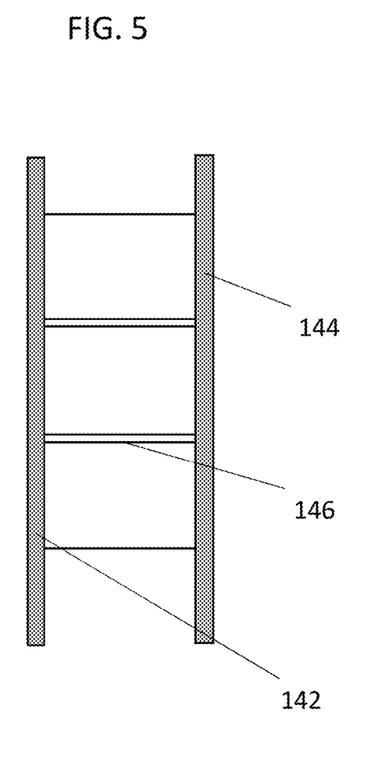
FIG. 5 is a cross-sectional view of an embodiment of a honeycomb sheet.
Figure 6:
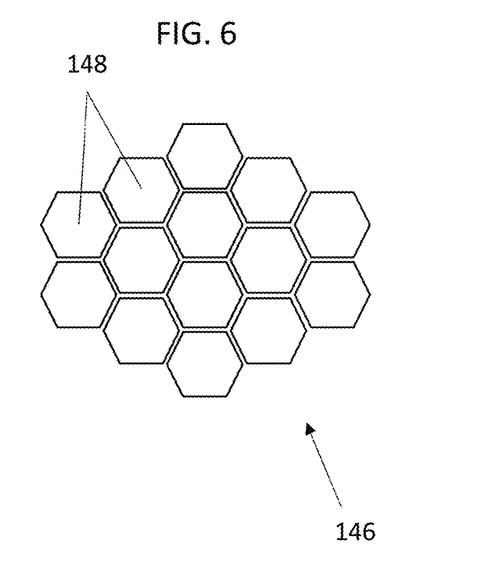
FIG. 6 is a plan view of an embodiment of a honeycomb core for a honeycomb sheet.

Referring to FIG. 5, the honeycomb sheet structure material includes a first face sheet 142 and a second face sheet 144 with a honeycomb core 146 positioned between the first face sheet 142 and the second face sheet 144. In some embodiments, one or more of the first face sheet 142, the second face sheet 144 and the honeycomb core 146 are formed from a metallic material, such as titanium, nickel, aluminum or other metals or alloys. The first face sheet 142, the second face sheet 144 and the honeycomb core 146 are secured to one another by, for example, welding or brazing. A plan view of an embodiment of honeycomb core 146 is shown in FIG. 6. In this embodiment, the honeycomb core 146 comprises a plurality of cells 148, which may be hexagonal in shape. In other embodiments, however, other cell shapes, such as triangular, pentagonal or other shapes may be utilized. In some forms the cells 148 may be closed, in some they may be open.

Figure 7:
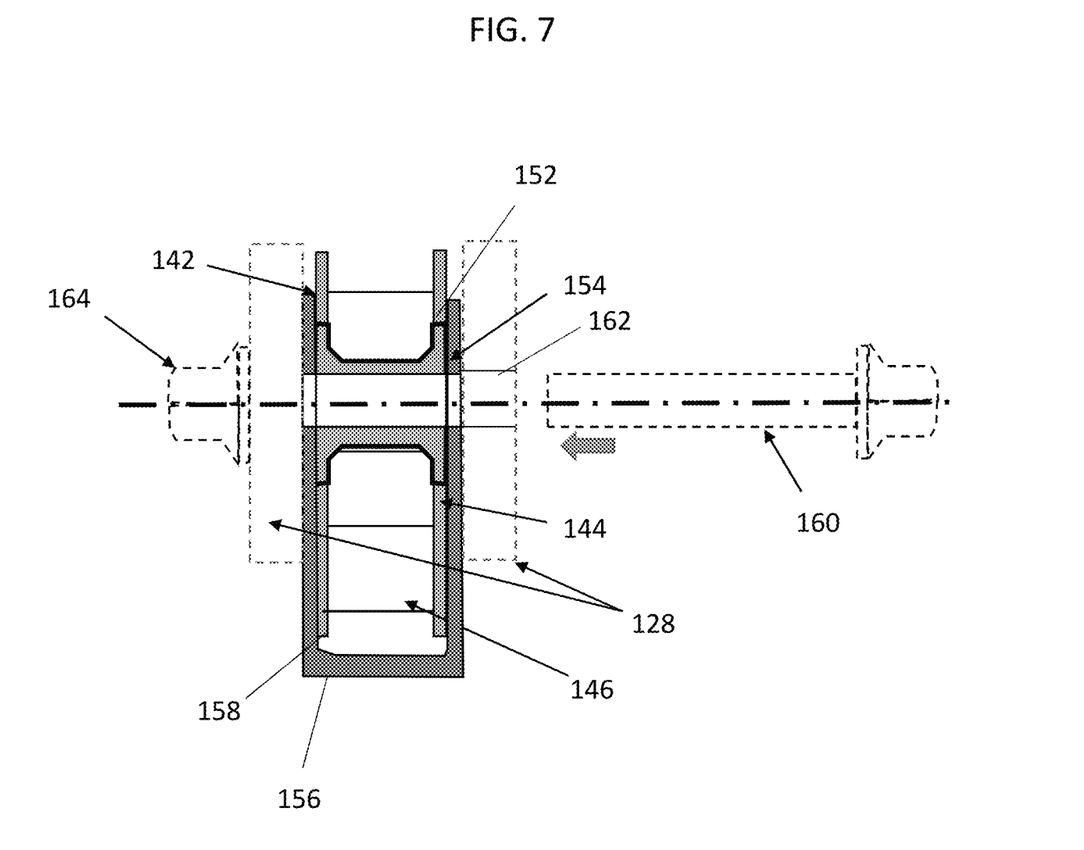
FIG. 7 is a cross-sectional view of an embodiment of an attachment point of a bridge bracket.

Referring again to FIG. 4, the bridge bracket 132 includes one or more attachment points 150 at each bracket end portion 136 for attachment of the bridge bracket 132 to the synchronization ring portions 128, 130. Referring now to FIG. 7, a cross-sectional view of an exemplary attachment point 150 is illustrated. The bracket end portion 136 includes a bracket opening 152 therethrough, into which an attachment spool 154 is installed. In some embodiments, the attachment spool 154 is metallic and is installed in the bracket opening 152 via orbital machining or electron-beam welding. An edge portion 156 is positioned over a bracket edge 158 and extends along the bracket end portion 136 over the attachment spool 154. In some embodiments, as in FIG. 7, the edge portion has a C-shaped cross-section and is formed from a metallic material. The edge portion 156 reinforces the attachment point 150 such that the attachment point 150 may withstand the assembly fastening loads and operational loads applied thereto. To secure the bridge bracket 132, a bolt 160 or other mechanical fastener is passed through a synchronization ring opening 162, through an edge portion opening, and through the attachment spool 154. A nut 164 is installed on the bolt 160.

Figure 8:
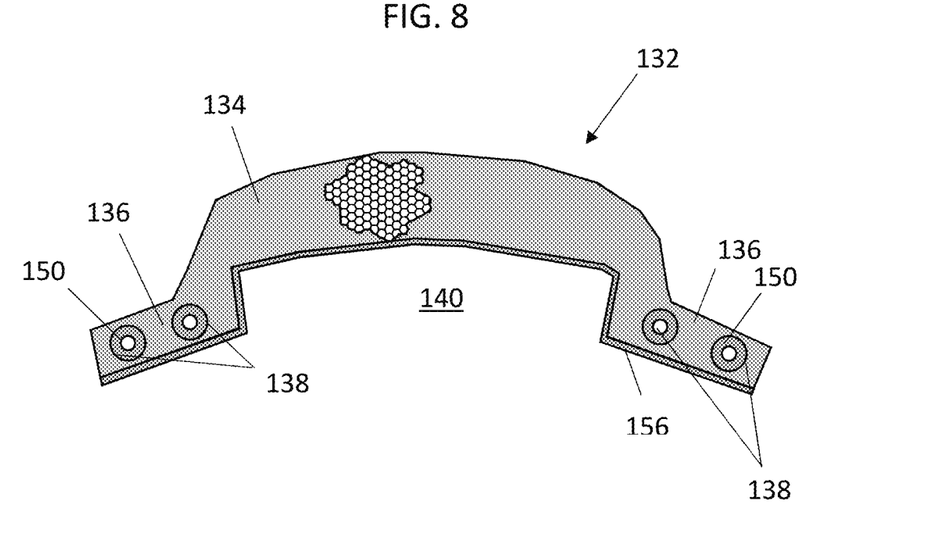
FIG. 8 is a plan view of another embodiment of a bridge bracket.
Figure 9:
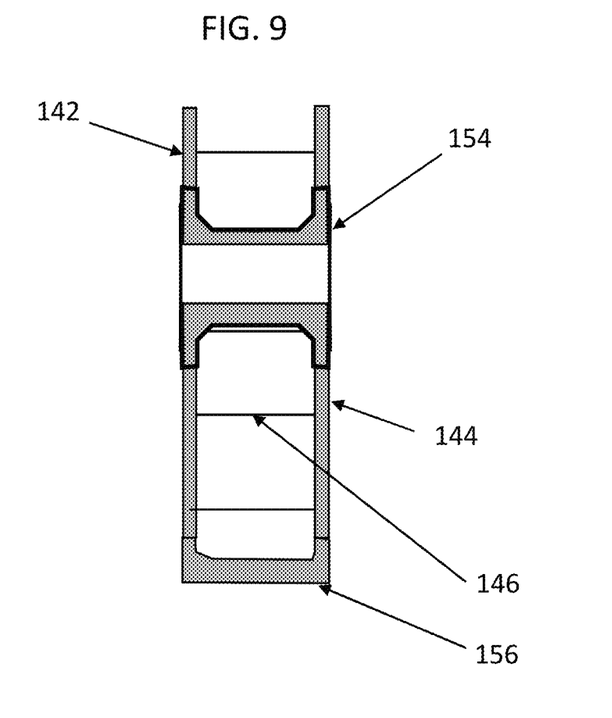
FIG. 9 is a cross-sectional view of another embodiment of a bridge bracket.

Referring now to FIGS. 8 and 9, another embodiment of a bridge bracket 132 is shown. In this embodiment, the edge portion 156 does not extend over the attachment spool 154, but is welded or brazed to the bracket edge 158.

Figure 10:
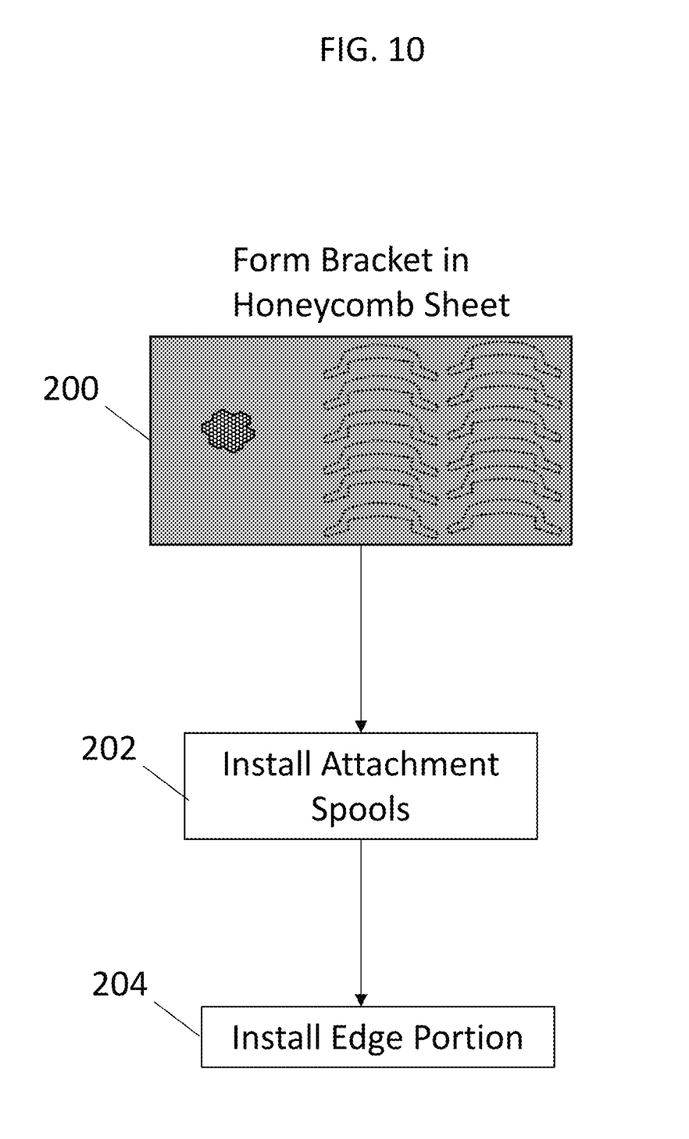
FIG. 10 is a schematic illustration of a method of forming a bridge bracket.

A method of making a bridge bracket 132 is schematically illustrated in FIG. 10. At block 200, a bridge bracket 132 is constructed from a honeycomb sheet. In some embodiments, as illustrated, multiple bridge brackets 132 are cut from the same honeycomb sheet. The bridge bracket 132 may be cut from the honeycomb sheet by, for example, wire electrical discharge machining (EDM), laser, or water jet. At block 202, the attachment spools 150 are installed by, for example, orbital machining or electron-beam welding. At block 204, the edge portion 156 is installed to the bracket edge 158 by, for example, mechanical joining, welding, brazing or other means.

Constructing the bridge bracket 132 from honeycomb sheet material provides a lightweight bridge bracket 132. The advantageous inherent in-plane strength and stiffness of the honeycomb core structure combined with the in-plane tensile, compression and bending loading needed for the bridge bracket 132 to transmit the circumferential motion between the synchronization ring portions 128, 130, make the honeycomb sheet construction an attractive and lightweight option, when compared to the typical machined bridge bracket 132.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bridge bracket for a variable-pitch vane system of a gas turbine engine, comprising:
   a first face sheet;
   a second face sheet;
   a honeycomb core disposed between the first face sheet and the second face sheet; and
   a first attachment feature disposed at a first end of the bridge bracket, configured for securing to a first synchronization ring; and
   a second attachment feature disposed at a second end of the bridge, configured for securing to a first synchronization ring;
   wherein the first attachment feature and the second attachment feature each comprise a spool extending through the bridge bracket from first face sheet to the second face sheet.

2. The bridge bracket of claim 1, wherein the one or more spools are secured in the bridge bracket by one of orbital machining or electron beam welding.

3. The bridge bracket of claim 1, wherein one or more of the first face sheet, the second face sheet and the honeycomb core are formed from a metallic material.

4. The bridge bracket of claim 1, further comprising a reinforcing edge portion secured to the bridge bracket.

5. The bridge bracket of claim 4, wherein the reinforcing edge portion extends over the one or more attachment features.

6. The bridge bracket of claim 4, wherein the reinforcing edge portion is secured to the bridge bracket via welding or brazing.

7. A variable-pitch vane system for a gas turbine engine, comprising:
   a plurality of vanes; and
   a synchronization ring assembly operably connected to the plurality of vanes, the synchronization ring assembly including:
      a first synchronization ring;
      a second synchronization ring; and
      a bridge bracket connecting the first synchronization ring to the second synchronization ring, the bridge bracket including:
         a first face sheet;
         a second face sheet;
         a honeycomb core disposed between the first face sheet and the second face sheet;
         a first attachment feature disposed at a first end of the bridge bracket at which the first synchronization ring is secured; and
         a second attachment feature disposed at a second end of the bridge bracket at which the second synchronization ring is secured;
      wherein the first attachment feature and the second attachment feature each comprise a spool extending through the bridge bracket from first face sheet to the second face sheet.

8. The variable-pitch vane system of claim 7, wherein the spool is secured in the bridge bracket by one of orbital machining or electron beam welding.

9. The variable-pitch vane system of claim 7, wherein one or more of the first face sheet, the second face sheet and the honeycomb core are formed from a metallic material.

10. The variable-pitch vane system of claim 7, further comprising a reinforcing edge portion secured to the bridge bracket.

11. The variable-pitch vane system of claim 10, wherein the reinforcing edge portion extends over one or more of the first attachment feature and the second attachment feature.

12. The variable-pitch vane system of claim 10, wherein the reinforcing edge portion is secured to the bridge bracket via welding or brazing.

13. A compressor section of a gas turbine engine comprising:
   a compressor case including:
      a first case portion; and
      a second case portion, the first case portion secured to the second case portion at a protruding flange;
   a plurality of vanes disposed in the compressor case; and
   a synchronization ring assembly disposed outside of the compressor case and operably connected to the plurality of vanes, the synchronization ring assembly including:
      a first synchronization ring;
      a second synchronization ring; and
      a bridge bracket disposed at the protruding flange and connecting the first synchronization ring to the second synchronization ring, the bridge bracket including:
         a first face sheet;
         a second face sheet;
         a honeycomb core disposed between the first face sheet and the second face sheet;
         a first attachment feature disposed at a first end of the bridge bracket at which the first synchronization ring is secured; and
         a second attachment feature disposed at a second end of the bridge bracket at which the second synchronization ring is secured.

14. The compressor section of claim 13, wherein the first attachment feature and the second attachment feature each comprise a spool extending through the bridge bracket from first face sheet to the second face sheet.

15. The compressor section of claim 14, wherein the spool is secured in the bridge bracket by one of orbital machining or electron beam welding.

16. The compressor section of claim 13, wherein one or more of the first face sheet, the second face sheet and the honeycomb core are formed from a metallic material.

17. The compressor section of claim 13, further comprising a reinforcing edge portion secured to the bridge bracket.

18. The compressor section of claim 17, wherein the reinforcing edge portion extends over one or more of the first attachment feature and the second attachment feature.

* * * * *